United States Patent [19]
Akesaka

[11] Patent Number: 4,936,441
[45] Date of Patent: Jun. 26, 1990

[54] VERTICAL TYPE CONVEYOR

[75] Inventor: Toshio Akesaka, Yokohama, Japan

[73] Assignee: Kabushiki Kaisha Iseki Kaihatsu Kaki, Tokyo, Japan

[21] Appl. No.: 409,418

[22] Filed: Sep. 19, 1989

[51] Int. Cl.⁵ .............................................. B65G 15/14
[52] U.S. Cl. ................................. 198/626.2; 198/806
[58] Field of Search ............... 198/626, 806, 840, 808, 198/627, 628, 842

[56] References Cited

U.S. PATENT DOCUMENTS

| | | | |
|---|---|---|---|
| 1,997,360 | 4/1935 | Crozier | 198/626 |
| 3,240,321 | 3/1966 | Presti et al. | 198/808 |
| 3,982,626 | 9/1976 | Mehta | 198/626 |
| 4,068,789 | 1/1978 | Young, Jr. et al. | 198/840 X |
| 4,195,724 | 4/1980 | Janitsch | 198/626 |
| 4,230,220 | 10/1980 | Iino | 198/626 X |
| 4,585,118 | 4/1986 | Plant | 198/626 X |

FOREIGN PATENT DOCUMENTS

| | | | |
|---|---|---|---|
| 45540 | 2/1982 | European Pat. Off. | 198/808 |
| 485702 | 9/1926 | Fed. Rep. of Germany | 198/626 |
| 1123345 | 9/1956 | France | 198/626 |
| 1166503 | 11/1958 | France | 198/808 |
| 846656 | 8/1960 | United Kingdom | 198/626 |
| 941051 | 11/1963 | United Kingdom | 198/808 |

Primary Examiner—Robert J. Spar
Assistant Examiner—Cheryl L. Gastineau
Attorney, Agent, or Firm—Stoel, Rives, Boley Jones & Grey

[57] ABSTRACT

A vertical type conveyor comprises a support; a plurality of belt pulleys rotatably supported by the support; a pair of endless conveyor belts traveling around the plurality of belt pulleys and defining an abutment area, in which the pair of conveyor belts are in contact with each other so as to confront each other; and a plurality of sets of roller assemblies supported by the support and disposed opposite to each other in the cross direction of both conveyor belts in the abutment area, wherein each roller assembly has a pair of carrier rollers for pinching both conveyor belts at respective lug portions of both conveyor belts, and the axes of rotation of two pairs of carrier rollers of each set of roller assemblies are set so as to gradually come closer to each other toward the proceeding direction of both conveyor belts.

4 Claims, 7 Drawing Sheets

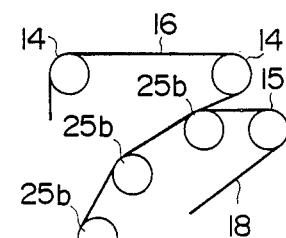
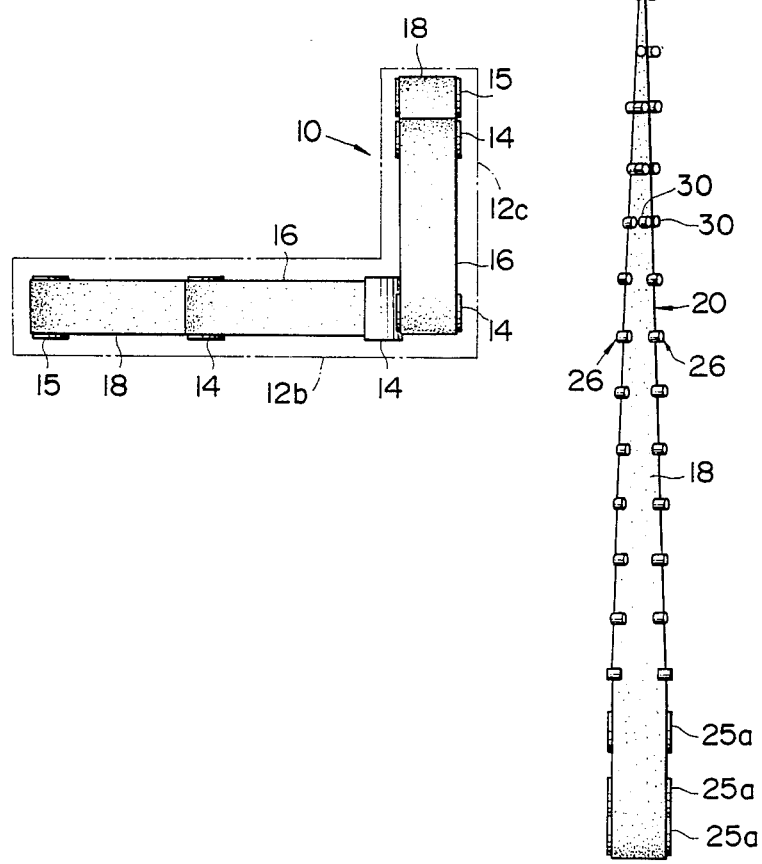
FIG. 3
FIG. 4

VERTICAL TYPE CONVEYOR

BACKGROUND OF THE INVENTION

1. Field of the Invention

This invention relates to a vertical type conveyor for carrying a load to be conveyed such as bulk cargo in the vertical direction or in inclined directions.

2. Description of the Prior Art

Conventionally, a vertical type conveyor, as disclosed in Japanese Patent Application Publication No. 61-3725, for example, is provided with a support, a plurality of pulleys rotatably supported by the support, a pair of conveyor belts traveling around the pulleys and a plurality of carrier rollers used for the conveyor belts. Both conveyor belts define an abutment area, in which both conveyor belts are in contact with and confront each other, and the carrier rollers are disposed at intervals in the abutment area in contact with both lug portions of each conveyor belt. Loads to be conveyed are pinched by both conveyor belts in the abutment area between both opposed lug portions to be moved along with the rotational drive of both conveyor belts.

According to the conventional vertical type conveyor as noted above, the carrier rollers are disposed so that first carrier rollers contacting a first conveyor belt are not opposed to second carrier rollers contacting a second conveyor belt with reference to each lug portion of the conveyor belts, and a force perpendicular to the belt surface is exerted against both conveyor belts. Accordingly, tension in the longitudinal direction of the conveyor belts is generated on both lug portions of the conveyor belts, and both conveyor belts are pinched with large force at the lug portions of the conveyor belts, so that the load to be conveyed is prevented from dropping out of a portion between both opposed lug portions.

However, a pinching force for pinching the load to be conveyed in the central portion of the conveyor belts is relatively lower. In order to avoid reduction of pinching force, it was indispensable to use a high rigidity conveyor belt whose pinching force is rather strong.

Further, since both conveyor belts are corrugated in shape as viewed from the side, the conveyor belts vary in peripheral speed at positions where respective carrier rollers are disposed, so that slip happens between the conveyor belts. As a result, the conventional vertical type conveyor generates slip between both conveyor belts and causes the conveyor belts to vibrate, thereby bringing about a large loss of drive force.

SUMMARY OF THE INVENTION

It is an object of the present invention to provide a vertical type conveyor, which dispenses with the use of a conveyor belt of high rigidity, and which does not cause vibrations of the conveyor belt, and is free from a large loss of drive force.

A vertical type conveyor according to the present invention comprises a support; a plurality of belt pulleys rotatably supported by the support; a pair of endless conveyor belts traveling around the belt pulleys, and defining an abutment area, in which both the conveyor belts are in contact with and confront each other; and a plurality of sets of roller assemblies supported by the support, and disposed opposite to each other in the cross direction of the conveyor belts; wherein each roller assembly has a pair of carrier rollers for pinching both the conveyor belts at respective lug portions of the conveyor belts, and axes of rotation of two pairs of carrier rollers of each set of roller assemblies are set so as to gradually come closer to each other in the proceeding direction of the conveyor belts.

According to the present invention, one set of two roller assemblies are so disposed that one roller assembly confronts the other roller assembly in the cross direction of the conveyor belts, and the axes of rotation of these carrier rollers of each set of roller assemblies are set so as to gradually come closer to each other in the proceeding direction of the conveyor belts. As a result, while both the conveyor belts are driven in the proceeding direction thereof, both lug portions of both the conveyor belts are subjected to outward tension in the cross direction of the conveyor belts in the position where both the conveyor belts are pinched by each pair of carrier rollers. Since these tensions act in opposite directions, the pinching force exerted against a load to be conveyed in the central portion of the conveyor belts, that is, a portion between both opposed portions of the conveyor belts, can be enhanced. Accordingly, it is possible to dispense with the use of a conveyor belt of high rigidity for exerting a large pinching force against the central portion of the conveyor belts. Further, since each roller assembly does not deflect the conveyor belts in the direction perpendicular to the belt surface and thereby produces no difference in proceeding speed between both the conveyor belts, said vertical type conveyor does not vibrate the conveyor belts and is free from a large loss of drive force.

Both the conveyor belts can be held under a twisted condition so as to set the discharging direction of the load to a desired direction. When the twisting is applied to the conveyor belts, the larger tension in the longitudinal direction acts on each lug portion of the conveyor belts rather than the central portion thereof. However, even in this case, the tension similar to that acting on the lug portion is given to both the conveyor belts in the cross direction.

In order to correct the meandering of the conveyor belts produced during the proceeding of the conveyor belts, preferably, each of two roller assemblies confronting each other in the cross direction of the conveyor belts is provided with a side roller contacting respective side surfaces of both the conveyor belts, while each roller assembly is set to be pivotable about a line extending in parallel with a line perpendicular to the conveyor belts.

When both conveyor belts meander, one of the side rollers of both confronting roller assemblies is swung due to the widthwise movement of the conveyor belts, while the other one is swung following up the meandering of the conveyor belts. During the above swinging action of the side rollers, an inclination angle of an axis of rotation of one carrier roller with respect to a line crossing the conveyor belts and an inclination angle of an axis of rotation of the other carrier roller with respect to the line crossing the conveyor belts are respectively gradually reduced and gradually increased. According to the increase and reduction of the inclination angle of the axes of rotation of both the carrier rollers with respect to the line crossing the conveyor belt, the tensions generated at both the lug portions of the conveyor belts are increased and reduced respectively to correct the meandering thereby, that is, the deviation of the conveyor belts.

Each roller assembly can be mounted on a rod suspended from the support. Thereby, each roller assembly following up the movement of the conveyor belts when the twisting is applied to the conveyor belts, is easily disposed in comparison with the case where each roller assembly is directly mounted on the support.

BRIEF DESCRIPTION OF THE DRAWINGS

The foregoing and other objects and features of the invention will become apparent from the following description of a preferred embodiment of the invention with reference to the accompanying drawings, in which:

FIG. 3 is a plan view schematically showing the vertical type conveyor of the present invention;

FIG. 4 is a schematic view showing the arrangement of a roller assembly;

DETAILED DESCRIPTION OF THE PREFERRED EMBODIMENT

Figure 1:
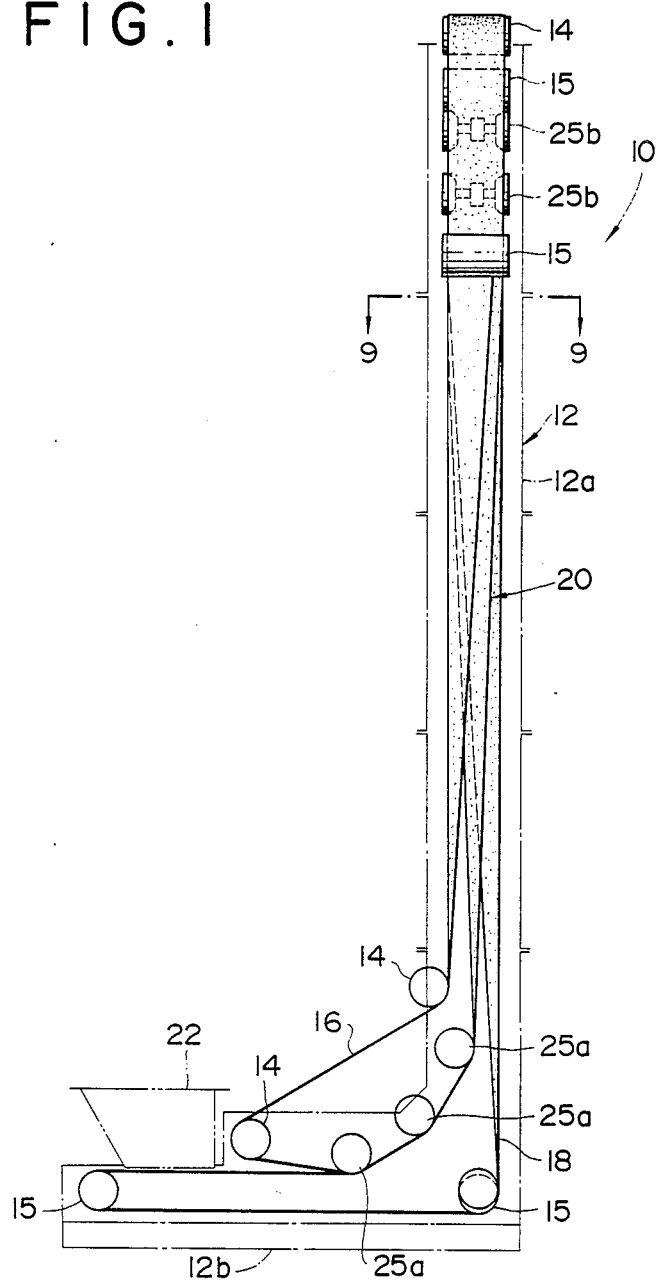
FIG. 1 is a front view schematically showing a vertical type conveyor according to the present invention.
Figure 2:
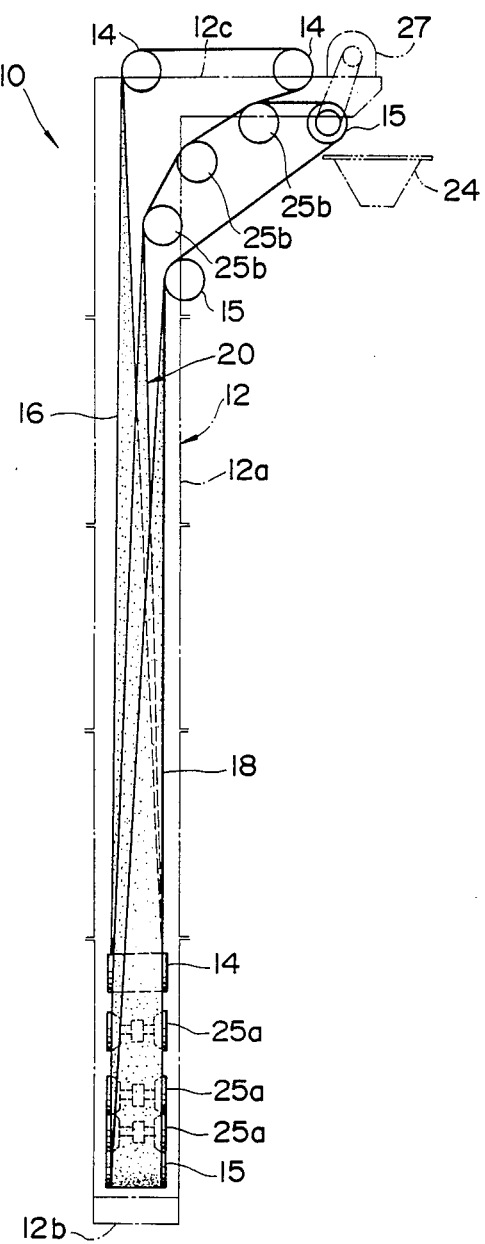
FIG. 2 is a right side view schematically showing the vertical type conveyor of the present invention.

As shown in FIGS. 1 through 3, a vertical type conveyor 10 according to the present invention comprises a support 12, a plurality of belt pulleys 14,15 rotatably supported by the support 12, and a pair of conveyor belts 16,18 traveling around the belt pulleys 14,15, wherein both of the conveyor belts are in contact with and confront each other in an abutment area 20. In the illustrated embodiment, the conveyor belts 16,18 are twisted at an angle of 90°.

The support 12 includes a strut portion 12a extending in the vertical direction or, if necessary, extending in inclined directions, and upper and lower horizontal portions 12c,12b respectively continuous with the strut portion. The upper horizontal portion 12c extends at a right angle to the lower horizontal portion 12b. A dumping hopper 22 and a receiving hopper 24 respectively used for dumping and receiving the load to be conveyed in bulk or of viscous material such as concrete and other particulate matter conveyed by making use of the vertical type conveyor 10 are respectively disposed on the lower and upper horizontal portions 12b,12c.

One set of three carriers 25a comprising three rollers and another set of three carriers 25b comprising three rollers, which define troughs for the conveyor belts, are disposed respectively in the neighborhood of opposite ends of the abutment area 20, and are supported by the support 12. Each axis of rotation of the carriers 25a and the belt pulleys 14,15 disposed on the lower portion of the support 12 extends at right angles to each axis of rotation of the carriers 25b and the belt pulleys 14,15 disposed on the upper portion of the support 12.

The carriers 25a located within a loop defined by the conveyor belt 16 exert a force on the conveyor belt 16 which is opposite to the force exerted by carriers 25a against the conveyor belt 18. On the other hand, the carriers 25b located within a loop defined by the conveyor belt 18 exert a force to the conveyor belt 18 against the conveyor belt 16.

As shown by a dotted lines in FIGS. 1 and 2, each of these six carriers 25a, 25b has a trough angle. Each carrier comprises a pair of large-diameter rollers being in contact with both lug portions of the conveyor belt and a small-diameter roller disposed between the large-diameter rollers such as to be coaxial with these large-diameter rollers, the small-diameter roller having a diameter smaller than that of each large-diameter roller and being in contact with a central portion of the conveyor belt, that is, a portion between the lug portions of the conveyor belt. A motor 27 is installed on the upper portion of the support 12. When the upper belt pulley 15 is rotated by the motor 27, one conveyor belt 18 is driven and the other conveyor belt 16 being in contact with the conveyor belt 18 is driven in response to the driving of the conveyor belt 18.

As shown in FIG. 4, a plurality of sets of two roller assemblies 26 confronting each other in the cross direction of each of the conveyor belts 16,18 are disposed at intervals in the longitudinal direction of each of the conveyor belts 16,18 in the abutment area 20 where both conveyor belts 16,18 abut on each other, more particularly in an area between the uppermost carrier 25a and the lowermost carrier 25b. Each set of two roller assemblies 26 is supported by the strut portion 12a through support means 28 (as shown in FIG. 5) surrounding the abutment area 20 within the strut portion 12a and extending along the abutment area 20.

Figure 5:
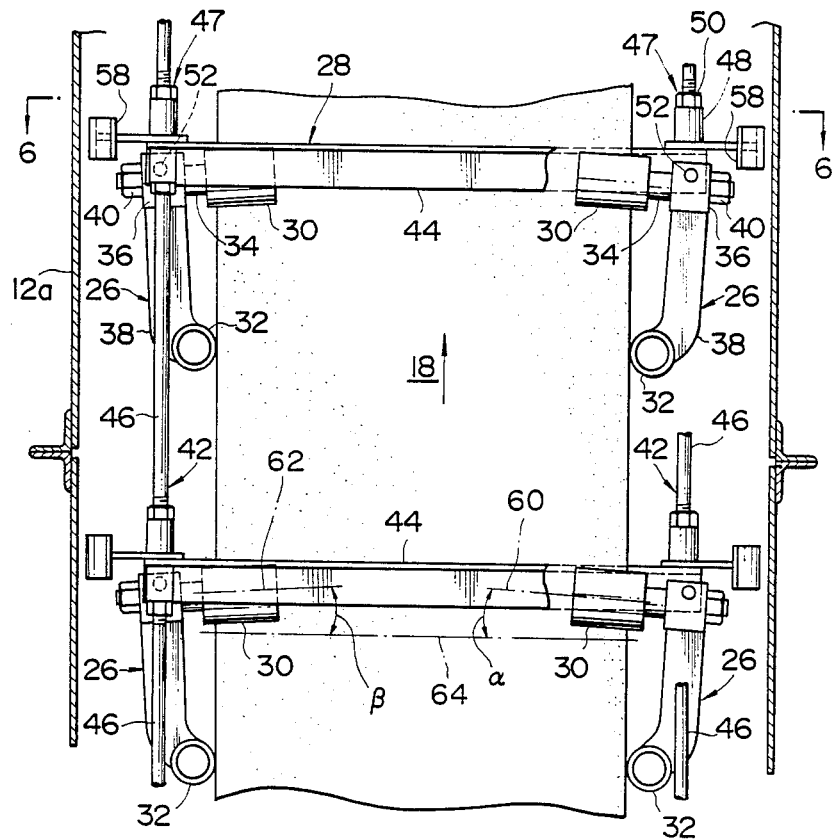
FIG. 5 is a fragmentary longitudinal cross-sectional view showing the vertical type conveyor of the present invention.
Figure 6:
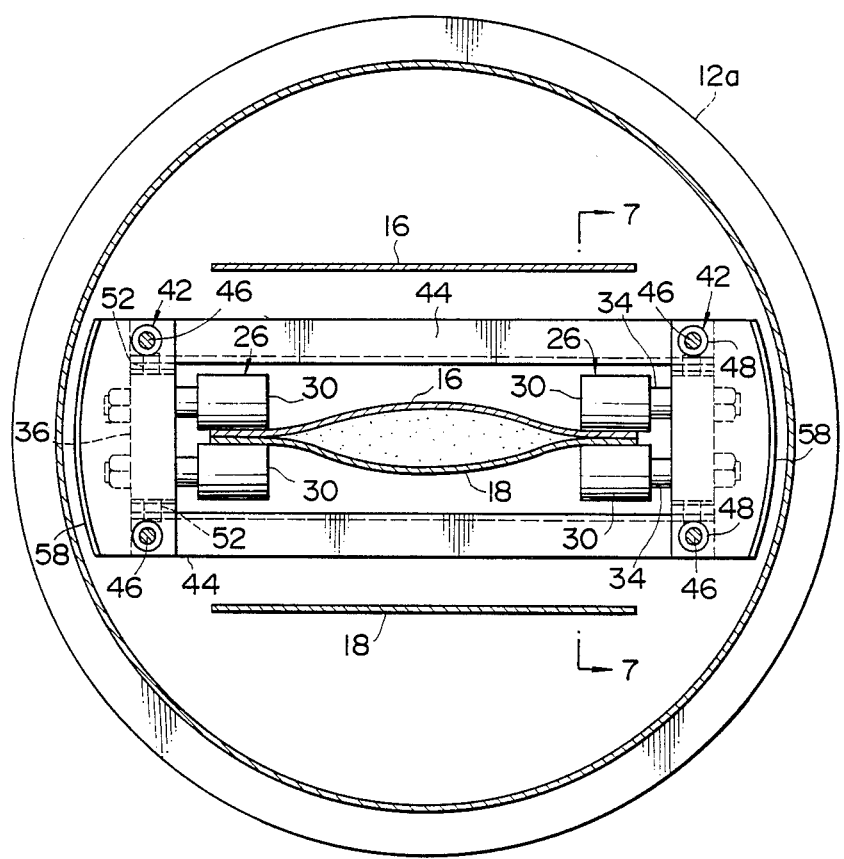
FIG. 6 is a transverse cross-sectional view taken along a line 6—6 in FIG. 5.
Figure 7:
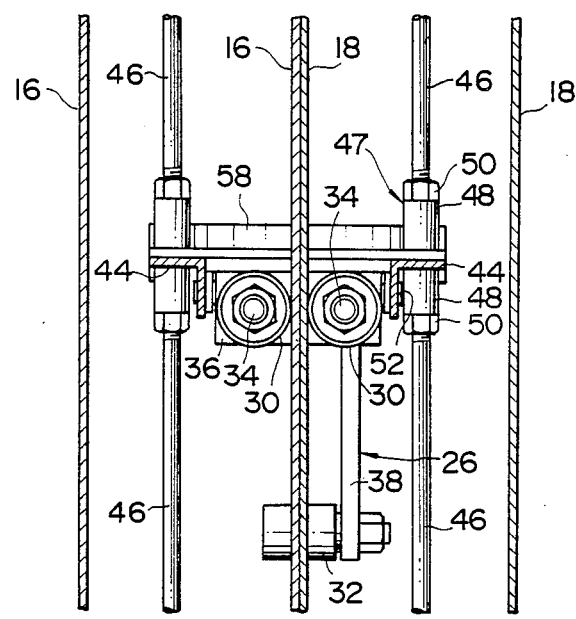
FIG. 7 is a longitudinal cross-sectional view taken along a line 7—7 in FIG. 6.

As shown in FIGS. 1 and 2, more particularly in FIGS. 5 through 7, a part of the strut portion 12a defining a space where the roller assemblies 26 and the support means 28 are disposed is formed of a cylindrical body which is so structured that a plurality of cylindrical members made of steel are stacked one above another in the axial direction and are connected with each other by the use of bolts, for example, on each flange fixed to opposite ends of each cylindrical member.

Each roller assembly 26 is provided with a pair of carrier rollers 30, each of which sandwiches each lug portion of both conveyor belts in the abutment area 20. Preferably, each roller assembly 26 is provided with a side roller 32 which is in contact with each side surface of the conveyor belt. Further, each roller assembly 26 has a pair of shaft portions 34, each of which rotatably supports the corresponding one of the pair of carrier rollers 30, a block-like base portion 36, and an arm portion 38 which extends from the base portion and rotatably supports the side roller 32. Each of the shaft portions 34 extends through the base portion 36 at right angles to the arm portion 38 and is fixed to the base portion 36 by the use of a nut 40 screwed onto an end of each shaft portion 34. Further, as shown in FIG. 8, the arm portion 38 extends from a position biased to one side of the pair of shaft portions 34.

On the other hand, the support means 28 for the roller assemblies 26 is suspended from the strut portion 12a, and comprises four rod-like bodies 42 extending in the vertical direction through four corners of a rectangle surrounding the abutment area 20 as viewed in the cross section and a plurality of pairs of connecting members 44 made of angle steel, for example, pairs which extend from confronting sides of the rectangle in the cross direction of the conveyor belts and are disposed at intervals in the vertical direction.

Each rod-like body 42 comprises a plurality of rods 46 having screw threads provided on opposite ends, and a joint 47 for connecting the pair of upper and lower rods 46 with each other. Each joint 47 consists of a rod-like external thread member (not shown) extending through an end of each connecting member 44, a pair of internal thread members 48 screwed respectively onto the opposite ends of the external thread member to fasten the external thread member to the end of each connecting member 44, and a pair of nuts 50 screwed respectively onto the pair of upper and lower rods 46 screwed respectively in both the external thread members and respectively being in contact with both of the internal thread members 48.

Figure 8:
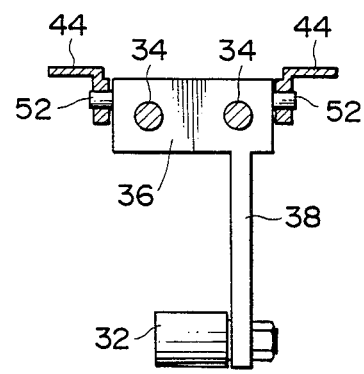
FIG. 8 is a side view showing the roller assembly as viewed in the same direction as that in FIG. 7 with a carrier roller being removed.

As shown in FIGS. 6 and 8, the base portion 36 of the roller assembly 26 is mounted between the ends of both of the connecting members 44 through a pair of pivots 52. Accordingly, each roller assembly 26 in the abutment area 20 is pivotable about a line extending in parallel to a line perpendicular to the belt surface of each of the conveyor belts 16,18, that is, an axis of the pivot 52.

Figure 9:
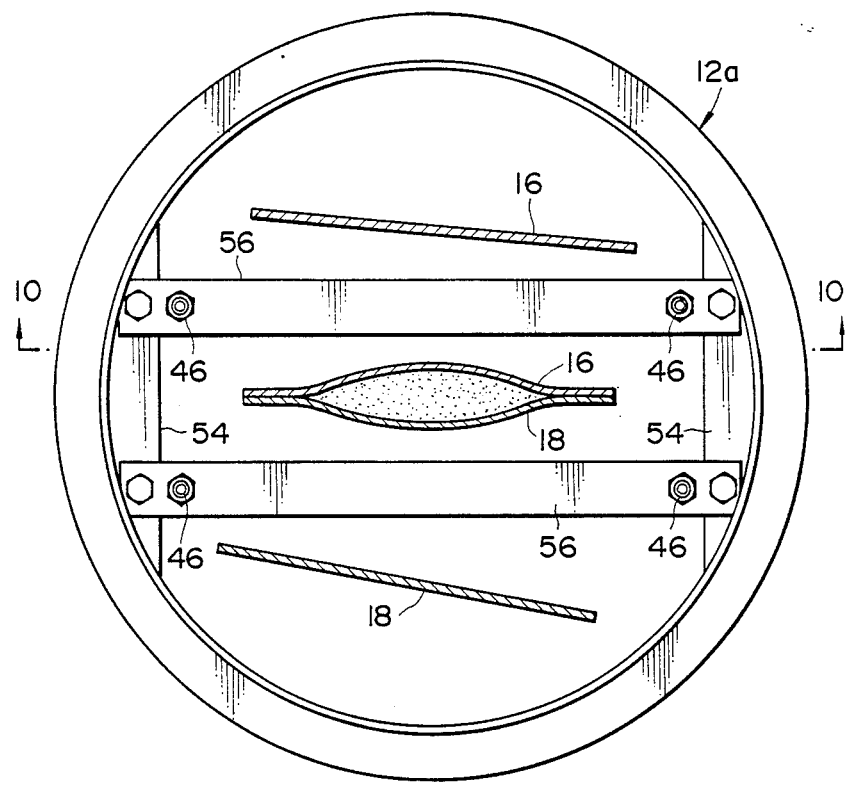
FIG. 9 is a transverse cross-sectional view taken along a line 9—9 in FIG. 1.
Figure 10:
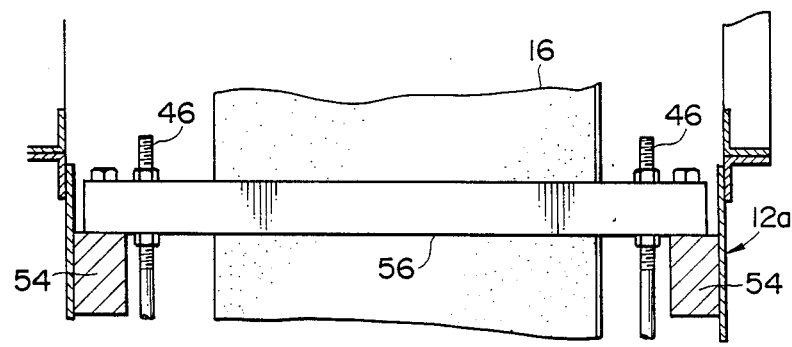
FIG. 10 is a fragmentary longitudinal cross-sectional view taken along a line 10—10 in FIG. 9.

As shown in FIGS. 9 and 10, a pair of beam members 56 are spanned at an interval across a pair of bed members 54 disposed opposite to each other on an inner peripheral surface of the uppermost portion of the cylindrical body constituting a part of the strut portion 12a, that is, on the inner peripheral surface of the uppermost cylindrical member. The pair of beam members 56 are fastened to the pair of bed members 54 by the use of bolts. The uppermost rod 46 of each rod-like body 42 are attached to these beam members 56.

A part of the strut portion 12a, in which the roller assemblies 26 are disposed, is formed of the cylindrical body, and the roller assemblies 26 are supported by the support means 28 suspended from the cylindrical body, so that when both conveyor belts 16,18 are subjected to twisting, the support means 28 is easily rotated along the inner peripheral surface of the cylindrical body as the guide surface. Preferably, a guide member 58 having a curved surface of the same curvature as that of the inner peripheral surface of the cylindrical body is provided at each end of both connecting members 44 such that the guiding action should be improved when the support means 28 is rotated, and also the swing of the support means 28 in the cross direction of each of the conveyor belts 16,18 should be minimized. In the illustrated embodiment, the twisting angle made by both conveyor belts 16,18 is defined as 90°, while it may be set to any value within the range of 0° to 180° clockwise or counterclockwise. Since the conveyor belts 16,18 are structured to be capable of twisting, the discharging direction of the load to be conveyed is easily changed at will, without shifting the whole vertical type conveyor, so that it is possible to relax restrictions on installation place of the belt conveyor. Portions of the belt pulleys 14,15 have their axes slightly inclined when the conveyor belts 16,18 are subjected to twisting.

Again referring to FIG. 5, the axes of rotation of two pairs of carrier rollers 30 of the pair of confronting roller assemblies 26 are set so as to gradually come closer to each other in the proceeding direction (direction indicated by an arrow in FIG. 5) of each of the conveyor belts 16,18 in the abutment area 20. That is, the axes 60,62 of rotation of two pairs of carrier rollers 30 make angles $\alpha$, $\beta$ with respect to crossing lines 64 of the conveyor belts within the range of 1° to 3°, respectively. The carrier rollers 30 pinch the lug portions of both conveyor belts 16,18 while the axes of rotation of these carrier rollers 30 make an angle with respect to the crossing line 64. The distance between each pair of carrier rollers 30 and each arm portion 38 is so regulated that the side rollers 32 of both conveyor belts 16,18 are brought into contact with the opposite sides of both conveyor belts.

When both conveyor belts 16,18 are driven in the proceeding direction (upward direction as indicated by an arrow in FIG. 5), each carrier roller 30 and each side roller 32 of each roller assembly 26 receive a rotating force from both conveyor belts 16,18 to be rotated. Since the axes of a pair of carrier rollers 30 extend as noted above, both conveyor belts 16,18 driven in the upward direction respectively receive rotational resistance from the carrier rollers 30 in a portion where both conveyor belts 16,18 and the carrier rollers 30 abut on each other. In response to the rotational resistance as noted above, both conveyor belts 16,18 respectively receive force directing outwardly (leftward and rightward in FIG. 5) in the cross direction of both conveyor belts at both lug portions thereof. Namely, each of the conveyor belts 16,18 receives tension outward in the cross direction of each of the conveyor belts 16,18. As a result, in the abutment area 20, both lug portions of both conveyor belts 16,18 are firmly pinched, enhancing force for pinching the load to be conveyed in the central portion between the opposed lug portions of both conveyor belts. Each lug portion of the twisted conveyor belts 16,18 receives longitudinal tension larger than that in the central portion between both lug portions, while the tension in the cross direction caused by each roller assembly 26 acts effectively even under the action of the longitudinal tension. Thus, even conveyor belts not so rigid as those in a horizontal conveyor, for example, can securely pinch the load to be conveyed.

Further, when both conveyor belts 16,18 meander, for instance, e.g., when both conveyor belts 16,18 are swung leftward in FIG. 5, the right roller assembly 26 is swung clockwise about the pivots 52 due to the rotational resistance exerted against the conveyor belts 16,18 by the pair of the carrier rollers 30, and during this action, the angle $\alpha$ defined by an axis 60 of the right carrier roller 30 and the crossing line 64 of each of the conveyor belts 16,18 is gradually increased, while maintaining the abutment of each side roller 32 against the side surface of each of the conveyor belts 16,18. On the other hand, the left roller assembly 26 is swung clockwise by the presence of angular moment caused by the side roller 32 receiving a force from each of leftward shifting conveyor belts 16,18. During this action the angle $\beta$ defined by an axis 62 of each carrier roller 30 of each left roller assembly 26 and the crossing line 64 of each conveyor belts 16,18 is gradually reduced.

The rotational resistance of each carrier roller 30 is increased as the angle $\alpha$, i.e. the inclination of the axis of each carrier roller 30 with respect to the crossing line 64 of each conveyor belts 16,18, increases, and the tension acting on both conveyor belts 16,18 is increased. Consequently, the leftward movement of both conveyor belts 16,18 is stopped and then the conveyor belts 16,18 are moved rightward until the tension is balanced between both of the left and right roller assemblies 26. Thereby, the meandering of both conveyor belts 16,18 is automatically regulated.

Further, the present invention can be applied to a vertical type conveyor having conveyor belts, to which no twisting is applied. "The confronting roller assemblies 26" implies a situation where these roller assemblies 26 are slightly deviated from each other in the longitudinal direction of both conveyor belts 16,18, in addition to a situation where these roller assemblies 26 are disposed completely opposite to each other. Moreover, the strut portion 12a can be formed of a frame which is circular in cross section, or a tubular body or a frame which has a different cross sectional configuration.

What is claimed is:

1. A vertical type conveyor, comprising:
   a support;
   a plurality of belt pulleys rotatably supported by said support;
   a pair of endless conveyor belts traveling around said plurality of belt pulleys and defining an abutment area in which said pair of endless conveyor belts are in contact with and confront each other; and
   a plurality of sets of roller assemblies supported by said support, and disposed opposite to each other in the cross direction of both said conveyor belts in said abutment area, wherein each roller assembly has a pair of carrier rollers for pinching both conveyor belts at respective lug portions thereof, and wherein axes of rotation of two pairs of carrier rollers in each set of roller assemblies gradually come closer to each other in the proceeding direction of said conveyor belts.

2. A vertical type conveyor according to claim 1, wherein both said conveyor belts are under a twisted condition.

3. A vertical type conveyor according to claim 1, wherein each roller assembly includes a side roller coming into contact with side surfaces of both said conveyor belts in said abutment area, said each roller assembly being swingable about a line extending in parallel with a line perpendicular to the belt surface of each of said conveyor belts.

4. A vertical type conveyor according to claim 1, wherein said plurality of sets of roller assemblies are supported by said support through support means suspended from said support.

* * * * *